United States Patent

[11] 3,616,964

| [72] | Inventor | Masaru Yamazaki<br>Hiroshima, Japan |
|---|---|---|
| [21] | Appl. No. | 880,564 |
| [22] | Filed | Nov. 28, 1969 |
| [45] | Patented | Nov. 2, 1971 |
| [73] | Assignee | Kansai Keikinzoku Kogyo Kabushiki Kaisha<br>Hiroshima Prefecture, Japan |
| [32] | Priority | Mar. 20, 1969 |
| [33] | | Japan |
| [31] | | 44/20669 |

[54] MEANS FOR ATTACHING A HANDLE TO A PAN
3 Claims, 3 Drawing Figs.

[52] U.S. Cl. .................................................... 220/94 R, 16/116 R
[51] Int. Cl. ....................................................... B65d 25/28
[50] Field of Search ............................................ 220/94 R; 16/116 R, 114, 110.5

[56] References Cited
UNITED STATES PATENTS

| 1,744,851 | 1/1930 | Wilson ........................ | 16/110 A |
| 1,974,618 | 9/1934 | Lent ............................. | 16/116 R |
| 2,172,524 | 9/1939 | Stevens ........................ | 16/116 R |
| 2,522,579 | 9/1950 | Le Rette ...................... | 16/116 R |

FOREIGN PATENTS

| 634,243 | 3/1950 | Great Britain ............... | 220/94 |

Primary Examiner—M. Henson Wood, Jr.
Assistant Examiner—John J. Love
Attorney—Holcombe, Wetherill & Brisebois ABSTRACT: Means for attaching a handle to a pan comprising a mounting plate having a central projection, which plate is spotwelded to the pan, a heat-insulating member nearly identical in shape to said mounting plate positioned between said pan and mounting plate, and means for attaching a handle to the projection on said mounting plate, which means comprises an adjustable screw. The purpose of this invention is to fasten the handle to the pan in such a way that it remains firmly attached to the pan despite repeated heating and cooling.

MEANS FOR ATTACHING A HANDLE TO A PAN

BACKGROUND OF THE INVENTION

The handle of a pan is usually fastened thereto by riveting. This mode of fastening, however, not only spoils the appearance of a pan but also causes inconvenience in washing, because the rivet head juts out inside the pan. Pans are commonly made of aluminum plate or are manufactured by aluminum casting. A handle made of heat-insulating material may be fastened to an aluminum mounting plate which is spotwelded to the pan, but heating of the pan during use expands the aluminum mounting plate more than the handle itself and repeated heating and cooling eventually loosens the connection between the handle and mounting plate.

SUMMARY OF THE INVENTION

The major object of this invention is to attach a handle to a pan by spotwelding the pan to an aluminum mounting plate, while preventing looseness between the plate and handle by reducing the expansion and contraction of the mounting plate and attaching the handle to the mounting plate by means of a screw which can be adjusted to overcome any looseness which may come about.

Figure 1:
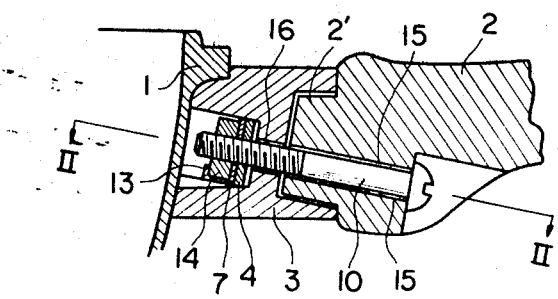
FIG. 1 is a longitudinal section taken through the mounting means according to this invention.
Figure 2:
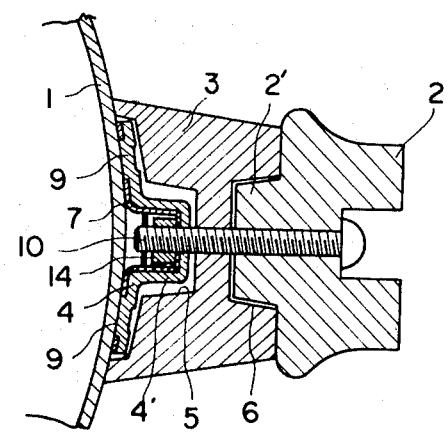
FIG. 2 is a section taken along the line II—II of FIG. 1.
Figure 3:
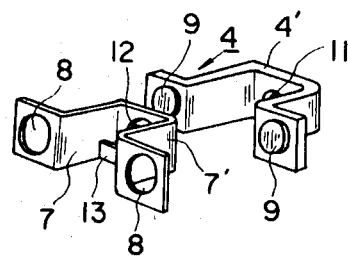
FIG. 3 shows an oblique exploded view of the attaching means.

In the drawing, reference numeral 1 indicates an aluminum pan having a handle 2 made of a synthetic resin. A metallic spacer 3 is inserted between the pan 1 and handle 2. As shown in FIGS. 2 and 3, an aluminum mounting plate 4 adapted to be spotwelded to the pan 1 to facilitate attachment of the handle 2 has a U-shaped projection 4' at its center. The metallic spacer 3 is provided with a first recess 5 which receives the mounting plate 4, and a recess 6 opposite the recess 5, which receives the tapered tip 2' of the handle 2. The pan 1 and mounting plate 4 are made of materials which are suitable for spotwelding. Reference numeral 7 indicates a heat-insulating member to be inserted between the pan 1 and the mounting plate 4, and this member is made of a material having a lower thermal coefficient of expansion than aluminum, for instance, iron plate or stainless steel plate. This heat-insulating member 7 has the same shape as the mounting plate 4 and is pierced at both ends by holes 8, 8, adapted to receive projections 9, 9 on the mounting plate 4. Holes 11, 12 for a screw 10 are provided in the U-shaped projection 4', the center of the mounting plate 4, and the heat-insulating member 7. Beneath the U-shaped projection 7' the heat-insulating member 7 is bent to form a stop 13. A nut 14 which fits the screw 10 is seated in the U-shaped projection 7 and the stop 13 prevents this nut from rotating.

Thus when the nut 14 is seated in the U-shaped projection 7' of the heat-insulating member 7 and the mounting plate 4 is attached to the heat-insulating member 7, with the projections 9, 9 on the mounting plate 4 in contact with the pan 1, and the heat-insulating member 7 between the mounting plate 4 and the pan 1, the mounting plate 4 may be spotwelded to the pan 1 at the positions of the contact projections 9, 9, thereby retaining the heat-insulating member therebetween. The mounting plate 4 is then capped by the spacer 3. The handle 2 is positioned against the tip of said spacer, the screw 10 is inserted through a hole 15 in the handle 2, a hole 16 in the spacer 3 and the holes 11, 12 in the mounting plate 4 and the heat-insulating member 7, and screwed into the nut 14, thereby fastening the handle 2 and the spacer 3 to the pan 1.

The heat-insulating member 7 inhibits expansion of the mounting plate 4 during either spotwelding or cooking and in consequence there is no possibility of the above-mentioned looseness developing between the pan 1 and the mounting plate 4.

During the spotwelding, the added heat raises the temperature of the pan 1 at the area which is in contact with contact projections 9, 9, so that the mounting plate 4, being smaller in mass, might easily be raised to high temperature. However, since the heat-insulating member 7 inhibits thermal transmission from the pan 1 to the mounting plate 4, the mounting plate 4 can maintain a temperature sufficiently low to avoid excessive expansion. The mounting plate 4 is spaced from the flame during cooking while the pan 1 is heated directly by the flame. If the heat-insulating member 7 did not inhibit thermal transmission from the pan 1 to the mounting plate 4, the mounting plate 4 would be quickly heated to a high temperature, but due to the insulation of the heat by the heat-insulating member 7, the mounting plate 4 can be kept at a lower temperature, preventing expansion.

As the aluminum mounting plate 4 is relatively weak it cannot hold its shape over a long period of use. In this invention, the heat-insulating member 7, is made of stronger material, for instance, iron or stainless steel, which can bear the strain caused by the adjustable screw 10, and the nut 14, thus preventing any looseness resulting from such deformation.

What is claimed is:

1. Means for attaching a handle made of heat-insulating material to an aluminum pan, said means comprising
    an aluminum mounting plate spotwelded to said pan and having a central projection;
    a heat-insulating member similar in shape to said mounting plate, positioned between said pan and said mounting plate, said heat-insulating member being provided with apertures through which said mounting plate is spotwelded to said pan, and being made of a metal having a lower thermal coefficient of expansion and greater mechanical strength than aluminum;
    an adjustable screw fastening said handle to the projection on said mounting plate and to said insulating member.

2. Attaching means as claimed in claim 1, comprising a spacer positioned between said handle and said mounting plate, said spacer being provided with a recess which receives the projection on said mounting plate.

3. Attaching means as claimed in claim 2 in which said screw extends through said spacer and said mounting member into a nut in said projection.

UNITED STATES PATENT OFFICE
CERTIFICATE OF CORRECTION

Patent No. 3,616,964    Dated November 2, 1971

Inventor(s) MASARU YAMAZAKI

It is certified that error appears in the above-identified patent and that said Letters Patent are hereby corrected as shown below:

[32] Priority   Mar. 10, 1969

Signed and sealed this 27th day of June 1972.

(SEAL)
Attest:

EDWARD M. FLETCHER, JR.         ROBERT GOTTSCHALK
Attesting Officer                Commissioner of Patents